Nov. 20, 1962   J. E. BURCH ETAL   3,064,289
AUTOMATIC LOADING RAMP

Filed April 4, 1958   3 Sheets-Sheet 1

INVENTORS.
JACK E. BURCH
MARVIN E. OAKES
KERMIT L. RACELY
BY John R. Walker, III
Attorney

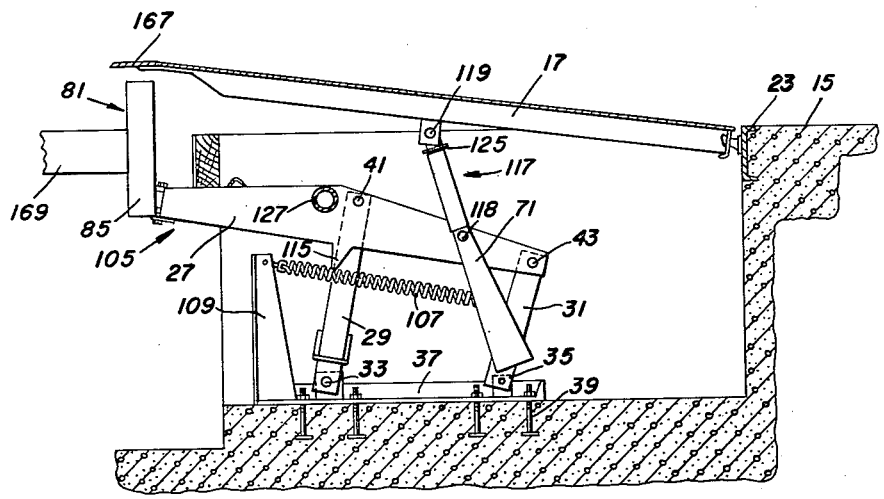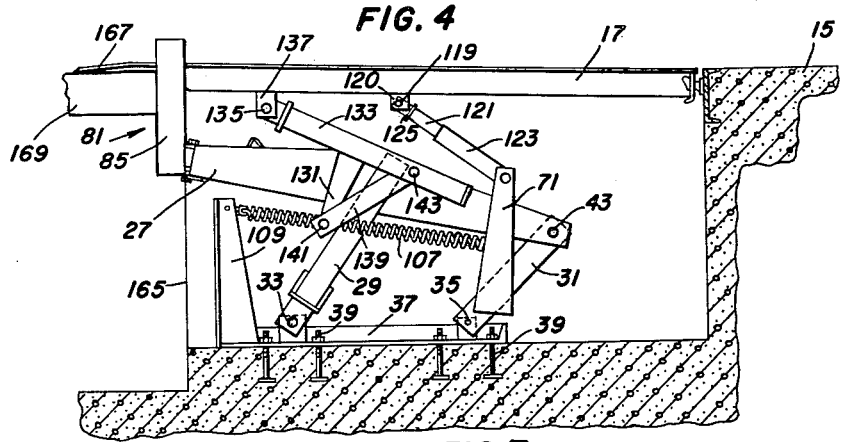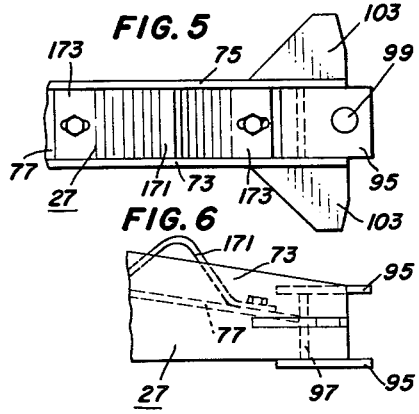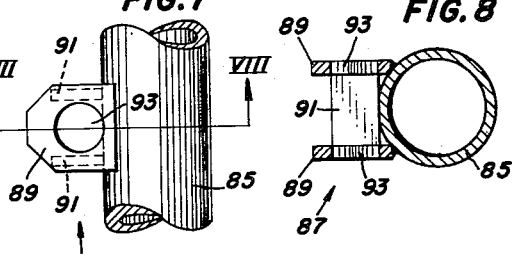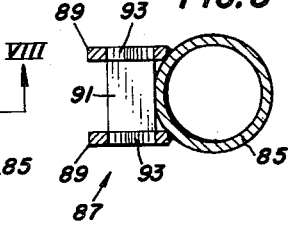

Nov. 20, 1962  J. E. BURCH ETAL  3,064,289
AUTOMATIC LOADING RAMP
Filed April 4, 1958  3 Sheets-Sheet 3

INVENTORS.
JACK E. BURCH
MARVIN E. OAKES
KERMIT L. RACELY
BY John R. Walker, III
Attorney

United States Patent Office 3,064,289
Patented Nov. 20, 1962

3,064,289
AUTOMATIC LOADING RAMP
Jack E. Burch, Marvin E. Oakes, and Kermit L. Racely, Memphis, Tenn., assignors to Dover Corporation, Washington, D.C.
Filed Apr. 4, 1958, Ser. No. 726,534
4 Claims. (Cl. 14—71)

This invention relates to a loading ramp. More particularly, it relates to that type of loading ramp having a platform pivotally mounted from a shipping and receiving dock or the like for pivotal movement about its rearward edge between raised and lowered positions, which platform is adapted to be automatically actuated by a truck backing into position adjacent the loading ramp for the transfer of loads between the truck and the shipping and receiving dock.

Heretofore, it was important for trucks to be backed substantially straight towards the actuating mechanism of such a loading ramp in a substantially "squared" position relative to the ramp, as distinguished from being backed at an angle towards the ramp. It was important because, otherwise, rubbing and binding between the truck and the actuating mechanism would occur and the actuating mechanism would be subjected to strain due to the force being applied against it at an angle. It is very difficult for the driver to back a truck towards the actuating mechanism in an exactly "squared" position relative to the ramp and valuable time is lost in trying to accomplish this result. It is obvious that many drivers would not take the time to orient the truck properly with the ramp and, thus, binding and "racking" would occur.

Therefore, one of the objects of the present invention is to provide in such a loading ramp a truck contacting bumper that is pivotally mounted to prevent binding or "racking" due to trucks contacting the bumper in an "out-of-square" position.

A further object is to provide in such a loading ramp means for automatically supporting the platform in the level position during the normal or "at-rest" position of the platform, whereby the platform will support cross traffic with safety while not being used to load or unload.

A further object is to provide an improved, efficient, and inexpensive automatic loading ramp construction.

A further object is to provide an improved actuating means for raising and lowering the loading ramp platform.

A further object is generally to improve the design and construction of automatic loading ramps.

The means by which the foregoing and other objects of the present invention are accomplished and the manner of their accomplishment will be readily understood from the following specification upon reference to the accompanying drawings, in which:

FIG. 3 is a sectional view taken as on the line III—III of FIG. 1 and showing the loading ramp being actuated by a truck backing against the bumper with parts of the loading ramp being removed for purposes of clarity and with the platform being shown in a fully raised position.

FIG. 4 is a sectional view taken as on the line IV—IV of FIG. 1 with parts of the loading ramp being removed for purposes of clarity and with the truck shown in a fully backed position.

FIG. 5 is a fragmentary plan view on an enlarged scale of the end of the pusher bar with the bumper disengaged therefrom.

FIG. 6 is a fragmentary side elevational view thereof.

FIG. 7 is a fragmentary plan view on a further enlarged scale of a portion of the bumper, shown disengaged from the pusher bar.

FIG. 8 is a sectional view taken as on the line VIII—VIII of FIG. 7.

Figure 1:
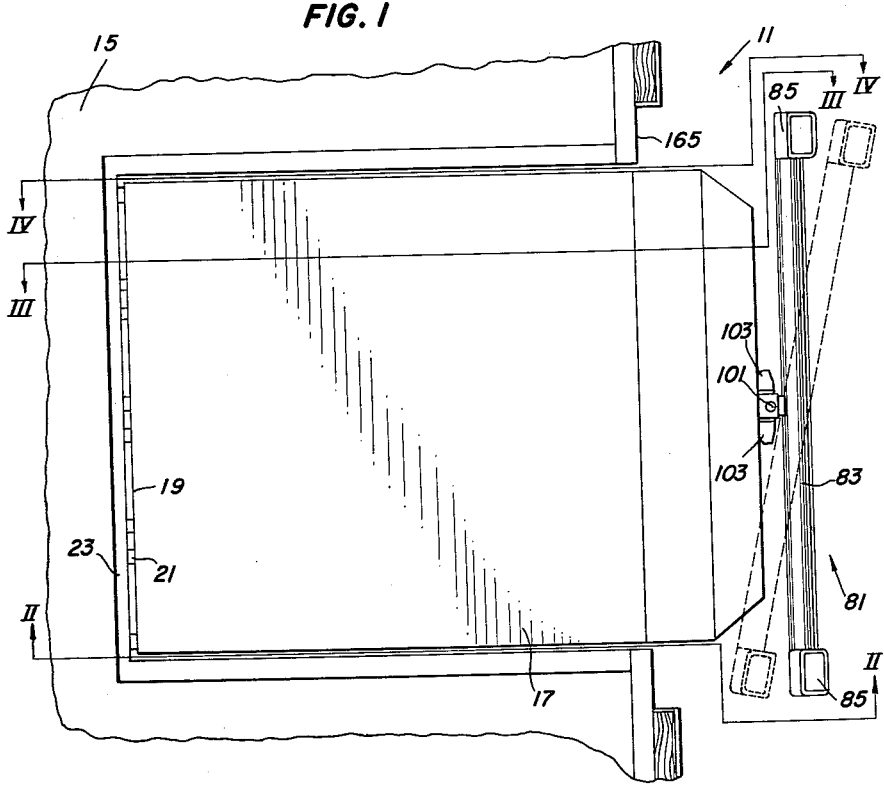
FIG. 1 is a plan view of the loading ramp of the present invention installed at a shipping and receiving dock.

Referring now to the drawings, in which the various parts are indicated by numerals, the loading ramp 11 of the present invention is adapted to be used in conjunction with a main dock, as a shipping and receiving dock, warehouse dock, or the like. Thus, in the present drawings, the loading ramp is illustrated set in a pit 13 of a main dock 15.

The structure selected for illustration is not intended to serve as a limitation upon the scope or teachings of the invention, but is merely illustrative thereof. Thus, for example, if desired, a loading ramp in accordance with the present invention may be constructed as a complete unit adapted to be set into a pit of a main dock without departing from the spirit and scope of the present invention.

Loading ramp 11 includes a substantially rectangular platform 17 which is pivotally mounted adjacent its rearward edge 19 from a supporting means for pivotal movement between raised and lowered positions. Thus, one form of this pivotal mounting is shown in the drawings in which it will be seen hinges 21 are mounted on channel member 23 which is anchored to the upper corner of pit wall 25 in accordance with conventional practice. If the loading ramp is constructed as a complete unit, it will be understood that the supporting means for the pivotal mounting of platform 17 would be the frame of the unit.

A pusher bar 27 is movably supported for forward and rearward reciprocating motion by a pair of spaced links, namely, a forward link 29 and a rearward link 31. Links 29, 31 are pivotally mounted adjacent their lower ends as at 33, 35, respectively, from a base 37 which is anchored as by bolts 39 embedded in the floor of pit 13. Links 29, 31 are pivotally mounted to pusher bar 27 as at 41, 43, respectively.

Figure 10:
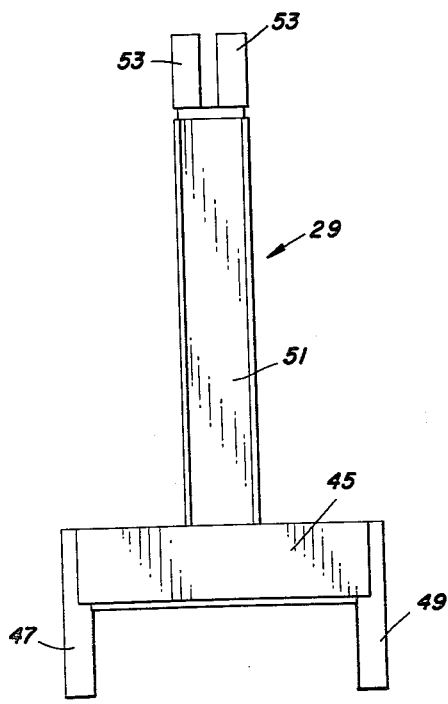
FIG. 10 is an elevational view on a further enlarged scale of the front link.

Forward link 29, which is best shown in FIG. 10, is preferably formed as follows: A transverse member 45 is provided with depending bearings 47, 49 adjacent the opposite ends thereof and an upstanding arm 51 is fixedly attached to transverse member 45 adjacent the mid-point thereof. Bearings 53 are provided adjacent the upper end of upstanding arm 51. It will be understood that bearings 47, 49 form a part of the pivotal connection with base 37 and bearings 53 form a part of the pivotal connection with pusher bar 27, these connections being made by any suitable means, as, for example, pins or the like.

Figure 11:
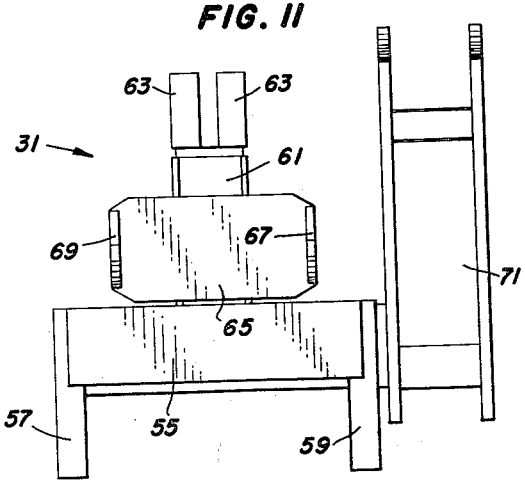
FIG. 11 is an elevational view on the scale of FIG. 10 of the rear link.

Referring now to rearward link 31, which is best shown in FIG. 11, the height of the rearward link is less than the height of forward link 29 but the main portion thereof is preferably of similar construction to that above described for forward link 29. That is, rearward link 31 is provided with a transverse member 55, a pair of depending bearings 57, 59, an upstanding arm 61, and upper bearings 63. Additionally, a plate 65 is fixedly attached adjacent the forward face of arm 61, which plate has projections 67, 69 fixedly attached thereto at the opposite ends of the plate. In addition, a rocker arm 71 is rigidly attached adjacent the lower end thereof to one side of rearward link 31 for movement with the link. It will be understood that bearings 57, 59 form a part of the pivotal connection with base 37 and that bearing 63 forms a part of the pivotal connection with pusher bar 27.

Figure 9:
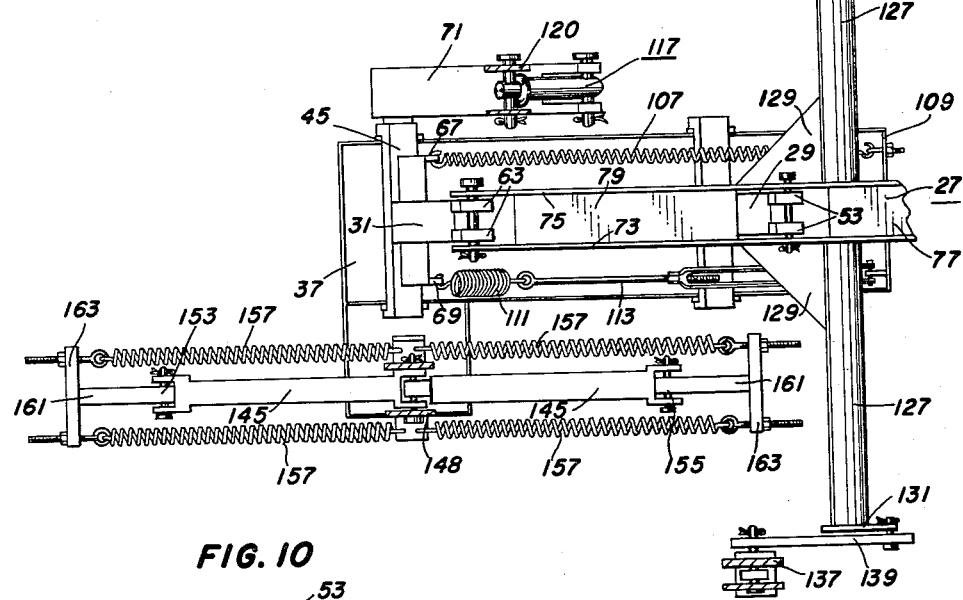
FIG. 9 is a fragmentary view on an enlarged scale taken as on the line IX—IX of FIG. 2.

Pusher bar 27 is preferably of composite construction to include spaced side members 73, 75 which are rigidly interconnected by intermediate members 77, 79 extending therebetween. Intermediate member 79 is spaced from the rearward end of pusher bar 27 to permit room for bearings 63 to be received between side members 73, 75 as best seen in FIG. 9. In addition, intermediate members 77, 79 are spaced apart, as shown in this figure, to provide room for bearings 53 to be received between side members 73, 75 for pivotal connection with the pusher bar.

A bumper 81 is pivotally mounted adjacent the forward end of pusher bar 27. This pivotally mounted bumper forms an important part of the present invention since the bumper prevents "racking" or binding due to trucks contacting the bumper in an "out-of-square" position, as will be more apparent in the description to follow of the operation of the device. Referring now more specifically to the details of construction of bumper 81 and its mounting, the bumper preferably comprises a transversely and horizontally extending elongated bumper bar 83 and a pair of upstanding bumper posts 85 respectively fixedly mounted adjacent opposite ends of the bumper bar. A bracket 87 is fixedly mounted intermediate the ends of bumper bar 83. Bracket 87 preferably comprises a pair of horizontally extending and vertically spaced plates 89 interconnected by a pair of vertically extending and horizontally spaced pieces 91. Vertically extending aligned apertures 93 are provided in plates 89.

The forward end of pusher bar 27 is preferably formed as follows so as to be adapted to be pivotally joined with bracket 87: A pair of vertically spaced and horizontally extending members 95 are fixedly mounted from side members 73, 75 adjacent the forward ends thereof and preferably extend beyond the ends of the side members. Members 95 are interconnected by a vertically extending member 97. Vertically extending bores 99 are respectively provided in horizontal members 95 and are disposed in aligned relationship. In the assembled disposition of bumper 81 and pusher bar 27, plates 89 are received between members 95 with apertures 93 and bores 99 being in alignment and receiving a pin 101 whereby pivotally connecting the bumper to the pusher bar so that the bumper is pivotal about a substantially vertical axis. A pair of stops 103 are mounted on opposite sides of pusher bar 27 adjacent its forward end and project laterally therefrom. Stops 103 are contacted by bumper bar 83 to limit pivoting movement of bumper 81 in either direction. Thus, as will be seen in FIG. 1, the bumper 81 is shown in solid lines in a transverse or mid-position and shown in dotted lines in a pivoted position in which the bumper is limited in movement by one of stops 103. It will be understood that bumper 81 may be pivoted in the opposite direction from that shown by the dotted lines so that the other stop 103 is contacted by bumper bar 83 to limit the pivoting movement of the bumper by substantially the same amount as that shown by the dotted line position.

Figure 2:
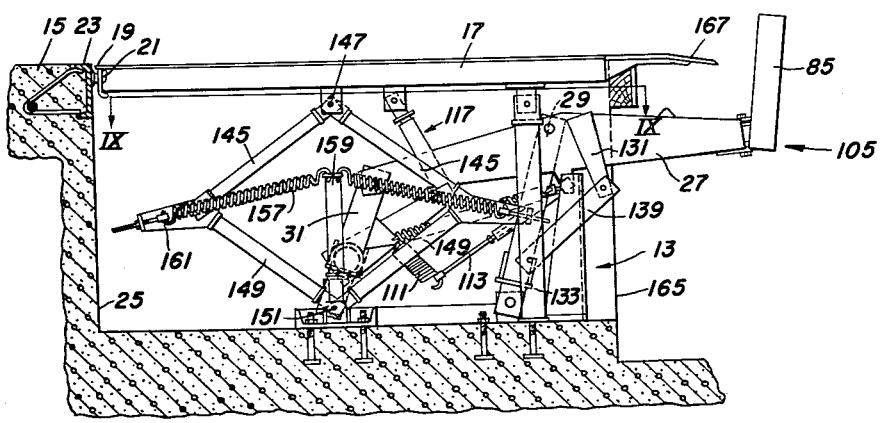
FIG. 2 is a sectional view taken as on the line II—II of FIG. 1, showing the loading ramp in a normal or "at-rest" position.

For the purposes of clarity, the designation pusher assembly 105 will be hereinafter used to designate the assembly comprising links 29, 31, rocker arm 71, pusher bar 27, and bumper 81. Also, the position of pusher assembly 105 when not contacted by a truck will be hereinafter designated as the "at-rest" or forward position, which position is best shown in FIG. 2. Resilient means is provided for urging pusher assembly 105 into said forward position. Said resilient means preferably comprises a spring 107 attached at one end to projection 67 and attached at the other end to a stationary upstanding member 109 of base 37. In addition, said resilient means includes a second spring 111 which is connected at one end to projection 69 and at the other end to an adjustable link 113. The other end of adjustable link 113 is connected to upstanding member 109. When pusher assembly 105 is in said forward position, there is no tension on spring 111 and the spring and link are in slack disposition as best shown in FIG. 2. It will be understood that with this arrangement spring 111 will not come into play until pusher assembly 105 has been moved rearwardly from said forward position. Thus, the force of both springs 107, 111 is used in the rearward positions of pusher assembly 105 when a greater force is needed, yet only the force of spring 107 is used in the forward positions, which prevents "slamming" of the pusher assembly into said forward position.

A lug 115 is fixedly mounted on pusher bar 27 and depends therefrom. Lug 115 contacts upstanding member 109 to stop pusher assembly 105 in said forward position.

A connecting rod 117 is pivotally connected adjacent its lower end as at 118 to the upper end of rocker arm 71 and pivotally connected as at 119 adjacent its upper end to platform 17 as by a bracket 120 attached to the platform and depending therefrom. Connecting rod 117 is preferably of a telescopic construction, including an inner rod 121 telescopically received within a cylinder 123. A stop 125 is fixedly mounted from inner rod 121 to limit the movement of inner rod 121 into cylinder 123. This particular construction of connecting rod 117 provides lost motion means, the purpose of which will be more apparent in the description of the operation of the device to follow.

Safety supporting means is provided for supporting platform 17 in a horizontal position when loading ramp 11 is in an "at-rest" position. The "at-rest" position of the entire loading ramp 11, as well as the "at-rest" or forward position of pusher assembly 105 as heretofore mentioned, is illustrated in FIG. 2. Said safety supporting means, which forms an important feature of the present invention, is automatic in operation as opposed to previous types of "manual set" locks heretofore provided for locking the ramps in the level position when not in use so that they may be used for cross traffic. Said safety supporting means of the present invention comprises a pair of arms 127 rigidly mounted from pusher bar 27 respectively on opposite sides thereof and extending laterally therefrom. Gussets 129 respectively fixedly attached to arms 127 on opposite sides of pusher bar 27 are provided for strength. The part of the safety supporting means adjacent the opposite ends of arms 127 is of substantially identical construction and, therefore, the description of one to follow will apply to both: A bar 131 is fixedly mounted adjacent the end of arm 127 and depends downwardly therefrom. A leg 133 is pivotally mounted as at 135 from platform 17 as by a bracket 137 or the like depending from the platform. A connecting piece 139 is pivotally connected adjacent one end to bar 131 as at 141 and pivotally connected adjacent the other end to leg 133 as at 143. This linkage means hereinabove described connecting pusher assembly 105 and leg 133 is arranged so that when loading ramp 11 is in said "at-rest" position leg 133 depends downwardly with the lower end thereof contacting the floor of pit 13 to support the platform. The parts are so arranged that the entire load, including the weight of platform 17 and any object thereon, is carried by legs 133 when the loading ramp is in said "at-rest" position. This is accomplished by arranging the parts so that stop 125 is spaced from cylinder 123 when the loading ramp is in said "at-rest" position, whereby none of the weight will be carried by connecting rod 117 when the loading ramp is in said "at-rest" position. When pusher assembly 105 is moved rearwardly, leg 133 is caused to be pivoted upwardly and rearwardly, as shown in FIG. 4, by bar 131 pushing the leg through connecting piece 139.

The weight of platform 17 is counterbalanced by a counterbalancing means best shown in FIGS. 2 and 9. Said counterbalancing means comprises a diamond-like structure including a pair of upper arms 145 respectively pivotally connected adjacent the upper ends thereof to platform 17 at pivot point 147, as by a bracket 143 depending from the platform. The other part of the diamond-like structure is formed by a pair of lower arms 149 pivotally connected adjacent the lower ends thereof from base 37 as at fixed pivot point 151 substantially beneath pivot point 147. The lower ends of upper arms 145 are respectively pivotally connected to the upper ends of lower arms 149 as at pivot points 153, 155. Said counterbalancing means additionally comprises resilient means as two pairs of springs 157. Each pair of springs is attached to a fixed upstanding post 159 at one of their ends and respectively attached at the opposite ends to extensions 161 of lower arms 149. Each extension 161, as viewed from the side as in FIG. 2, extends at an angle relative to the main body of its related arm 149 and forms a rigid extension thereof. Each extension 161 includes a transverse member 163 projecting laterally to either side of the main body of extension 161 to permit room for springs 157 to function. It is to the transverse members 163 that the ends of springs 157 are attached as by means of eye bolts or the like. The height of post 159 is preferably such that each pair of springs 157 angles downwardly from the post to the points of attachment with arms 149. The relationship between springs 157, arms 145, 149, and platform 17 is such that the weight of the platform is counterbalanced by a force somewhat less than its weight—as, for example, 90%—so that, if platform 17 is unrestrained except for the counterbalancing means, the platform will tend to move towards a lowered position. It will be understood that the opposite side corners of the diamond-like structure are urged inwardly, i.e., points 153, 155 are urged toward post 159 by springs 157, whereby exerting a counterbalancing force on platform 17 at the point of connection with the platform. The above-mentioned parts are so arranged that the increasing force of springs 157, as they are extended, operates on the increasingly inclined arms 149 to keep the upthrust on platform 17 substantially constant in all positions of the platform.

Referring now to FIG. 2, it will be seen that in said "at-rest" position of loading ramp 11 pusher assembly 105 is in its forwardmost position with links 29, 31 angled forwardly, pusher bar 27 in an extended position extending in spaced relationship from the forward wall 165 of main dock 15 and forward beyond the lip 167 of platform 17. Additionally, when loading ramp 11 is in said "at-rest" position, rocker arm 71 is angled forwardly, connecting rod 117 is angled rearwardly, and platform 17 is supported in a substantially horizontal or level position by means of legs 133 as heretofore described.

In the operation of loading ramp 11, a truck backs against bumper 81, a fragmentary portion of the truck bed being shown as at 169. As the truck backs, it urges pusher assembly 105 rearwardly against the force of spring 107 and eventually spring 111, carrying rearwardly with it rocker arm 71. As rocker arm 71 moves rearwardly in rocking movement, the upper end of rocker arm 71 moves in an arc towards pivot point 119, which causes connecting rod 117 to push upwardly on platform 17 until the platform reaches the raised position shown in FIG. 3. As the truck continues to back from the position shown in FIG. 3 toward the position shown in FIG. 4, the upper end of rocker arm 71 moves rearwardly away from pivot point 119 to permit platform 17 to lower until lip 167 rests on the truck bed as best seen in FIG. 4. It will be noted that, due to the lost motion permitted by the telescopic construction of connecting rod 117, the truck can continue moving pusher assembly 105 rearwardly until bumper posts 85 engage the forward wall 165, as best seen in FIG. 4. In this figure, it will be seen pusher assembly 105 is in a rearward or retracted position; links 29, 31 are inclined rearwardly; rocker arm 71 is inclined rearwardly; and connecting rod 117 is inclined forwardly. It wil be noted in FIG. 4 that a truck is being accommodated which has a bed height greater than the horizontal or level position of platform 17, whereby the platform is tilted upwardly when its rests on the truck bed. It will be understood that other heights of truck beds may be accommodated— for example, one which is less than the height of the horizontal or level position of platform 17—in which case platform 17 is permitted to incline downwardly since legs 133 are moved out of the supporting position. The lower limit of the downward inclination of platform 17 is reached when the platform abuts a stop 171 provided on pusher bar 27. Stop 171 is preferably substantially triangular in cross-section and provided with flanges 173 which are fixedly attached to intermediate member 77, as by bolts or the like. Due to the telescopic construction of connecting rod 117, platform 17 will automatically adjust as the truck bed rises and falls during loading and unloading. When truck 169 departs, springs 107, 111 urge pusher assembly 105 forward, raising platform 17 by connecting rod 117 pushing thereagainst and then lowering it until the platform is again in a horizontal position and the platform rests on legs 133.

It will be understood that if truck 169 is out of square relative to loading ramp 11, i.e., the rearward edge of the truck bed is not parallel with bumper bar 83, the bumper will pivot until in a flat disposition relative to the rearward edge of the truck bed, thereby preventing any "racking" or binding.

Although the invention has been described and illustrated with respect to a preferred embodiment thereof, it is to be understood that it is not to be so limited since changes and modifications may be made therein which are within the full intended scope of this invention as hereinafter claimed.

We claim:

1. A loading ramp comprising a fixed supporting means, a platform pivotally mounted adjacent its rearward edge from said supporting means for pivotal movement between raised and lowered positions; a pusher assembly including a pusher bar, a pair of spaced links pivoted adjacent the lower ends thereof at fixed pivot points, a bumper pivotally connected intermediate its ends to said pusher bar for pivoting movement about a substantially vertical axis, stops mounted on said pusher bar to limit pivoting movement of said bumper, and a rocker arm fixedly connected to one of said links for pivoting movement therewith, said pair of links being respectively pivotally connected to said pusher bar for movable support thereof; said pusher assembly being movable in a path of movement between a forward position and a rearward position relative to said platform, means connected to said pusher assembly to urge said pusher assembly into said forward position for actuation rearwardly towards said rearward position by a truck pushing rearwardly against said bumper; at least one laterally projecting arm fixedly mounted on said pusher assembly for movement rearwardly with said pusher assembly, a depending bar fixedly mounted adjacent the distal end of said arm for rearward movement therewith, a leg pivotally connected to said platform and depending therefrom to aid in support of said platform in a substantially horizontal position, a connecting piece pivotally connected adjacent one end thereof to said bar, said connecting piece extending substantially rearwardly from the connection with said bar and being pivotally connected adjacent its rearward end to said leg intermediate the length thereof whereby the rearward movement of said bar with said arm upon rearward movement of said pusher assembly is effective to urge said leg to pivot upwardly and rearwardly, a connecting rod pivotally connected adjacent one end to said rocker arm and pivotally connected adjacent the opposite end to said platform, said connecting rod being responsive to rearward movement of said pusher assembly to push said platform upwardly to a raised position and thence permit said plaftorm to lower onto the bed of the truck, said connecting rod including an inner rod telescopically received within a cylinder whereby permitting limited movement of said platform independently of said pusher assembly to allow said platform to adjust to changes in the truck height during loading and unloading.

2. A loading ramp comprising a fixed supporting means, a platform pivotally mounted adjacent its rearward edge from said supporting means for pivotal movement between raised and lowered positions; a pusher assembly including a pusher bar, a pair of spaced links pivoted adjacent the lower ends thereof at fixed pivot points, a bumper pivotally connected to said pusher bar for limited pivoting movement about a substantially vertical axis, and a rocker arm fixedly connected to one of said links for pivoting movement therewith, said pair of links being respectively pivotally connected to said pusher bar for movable support thereof; said pusher assembly being movable in a path of movement between a forward position and a rearward position relative to said platform, means connected to said pusher assembly to urge said pusher assembly into said forward position for actuation rearwardly towards said rearward position by a truck pushing rearwardly against said bumper; at least one laterally projecting arm fixedly mounted on said pusher assembly for movement rearwardly therewith, a depending bar fixedly mounted adjacent the end of said arm for movement rearwardly therewith, a leg pivotally connected to said platform and depending therefrom to aid in support of said platform in a substantially horizontal position, a connecting piece pivotally connected adjacent one end thereof to said bar, said connecting piece extending substantially rearwardly from the connection with said bar and being pivotally connected adjacent its rearward end to said leg intermediate the length thereof whereby the rearward movement of said bar with said arm upon rearward movement of said pusher assembly is effective to urge said leg to pivot upwardly and rearwardly, and a connecting rod pivotally connected adjacent one end to said rocker arm and pivotally connected adjacent the opposite end to said platform for pivoting said platform in response to rearward movement of said pusher assembly.

3. A loading ramp comprising a fixed supporting means, a platform pivotally mounted adjacent its rearward edge from said supporting means for pivotal movement between raised and lowered positions, a pusher assembly movably mounted for movement between a forward position and a rearward position, means connected to said pusher assembly to urge said pusher assembly into said forward position for actuation rearwardly towards said rearward position by a truck pushing rearwardly against said pusher assembly, said pusher assembly including a pusher bar and a truck contacting bumper pivotally mounted from said pusher bar for limited pivoting movement about a substantially vertical axis to compensate for an out-of-square position of the truck, at least one arm means fixedly mounted on said pusher assembly and projecting laterally therefrom for rearward movement therewith, a leg pivotally connected to said platform and depending therefrom to aid in support of said platform in a substantially horizontal position, strut means pivotally connected adjacent one end to said arm means and pivotally connected adjacent the opposite end to said leg for urging said leg upwardly and rearwardly upon rearward movement of said pusher assembly, means pivotally interposed and reacting between said pusher assembly and said platform in response to rearward movement of said pusher assembly for first pushing said platform upwardly to a raised position above the level of the bed of the truck and for subsequently moving in a direction away from said platform whereby said platform is adapted to lower onto the bed of the truck.

4. A loading ramp comprising a fixed supporting means, a platform pivotally mounted adjacent its rearward edge from said supporting means for pivotal movement between raised and lowered positions, a pusher assembly movably mounted for movement between a forward position and rearward positions, means connected to said pusher assembly to urge said pusher assembly into said forward position for actuation by a truck backing rearwardly against said pusher assembly, said pusher assembly including a pusher bar and an elongated truck contacting bumper, said bumper being disposed forwardly of and extending transversely of said platform and being freely pivotally mounted from said pusher bar for pivoting movement in a substantial arc about a substantially vertical axis, when said bumper is contacted by a truck out-of-square relative thereto said bumper being pivotal from an angular position relative to the rearward contacting edge of the truck to a position substantially flat against the rearward contacting edge of the truck in response to the truck backing thereagainst, connecting means pivotally interposed and reacting between said pusher assembly and said platform in response to rearward movement of said pusher assembly for first pushing said platform upwardly to a raised position above the level of the bed of the truck and for subsequently moving in a direction away from said platform whereby said platform is adapted to lower onto the bed of the truck; said means to urge said pusher assembly into said forward position comprising a fixed member, a first resilient means interconnected between said fixed member and said pusher assembly, a link connected at one end to said fixed member, and a second resilient means connected at one end to said pusher assembly and connected at the other end to said link, said first and second resilient means being under tension when said pusher assembly is adjacent said rearward positions, and said link and said second resilient means being in a slack disposition when said pusher assembly is adjacent said forward position whereby preventing slamming of said pusher assembly into said forward position.

References Cited in the file of this patent

UNITED STATES PATENTS

| Re. 8,448 | Cumings | Oct. 15, 1878 |
| 1,925,461 | Ridge | Sept. 5, 1933 |
| 2,527,653 | Pierce | Oct. 31, 1950 |
| 2,602,944 | Richardson | July 15, 1952 |
| 2,700,169 | Henion | Jan. 25, 1955 |
| 2,739,325 | Grace | Mar. 27, 1956 |
| 2,751,615 | Kelley | June 26, 1956 |
| 2,994,894 | Loomis | Aug. 8, 1961 |

FOREIGN PATENTS

| 53,493 | Denmark | Aug. 23, 1937 |
| 726,124 | Great Britain | Mar. 16, 1955 |

OTHER REFERENCES

Flow, May 1956, page 16.